(12) United States Patent
Amerpohl

(10) Patent No.: US 7,495,172 B2
(45) Date of Patent: Feb. 24, 2009

(54) OUTDOOR SEALING END

(75) Inventor: Uwe Amerpohl, Bergisch Gladbach (DE)

(73) Assignee: NKT Cables GmbH, Cologne (DE)

( * ) Notice: Subject to any disclaimer, the term of this patent is extended or adjusted under 35 U.S.C. 154(b) by 0 days.

(21) Appl. No.: 11/833,335

(22) Filed: Aug. 3, 2007

(65) Prior Publication Data
US 2008/0029289 A1    Feb. 7, 2008

(30) Foreign Application Priority Data
Aug. 3, 2006 (DE) .................. 10 2006 036 233

(51) Int. Cl.
*H02G 15/02* (2006.01)
(52) U.S. Cl. .................. 174/73.1; 174/142; 174/75 D; 174/77 R; 174/176; 439/882; 292/256.67
(58) Field of Classification Search ............ 174/77 R, 174/74 R, 93, 92, 75 R, 84 R, 135, 152 R, 174/360, 73.1, 142, 75 D, 176, 169; 439/882, 439/932; 292/256.67, 256.73, 256.71
See application file for complete search history.

(56) References Cited

U.S. PATENT DOCUMENTS

| 5,130,495 | A |   | 7/1992  | Thompson |
| 5,397,859 | A | * | 3/1995  | Robertson et al. ............ 174/92 |
| 5,949,022 | A | * | 9/1999  | Park et al. ................. 174/77 R |
| 6,198,048 | B1 | * | 3/2001 | Juhel et al. ................ 174/84 R |
| 6,284,976 | B1 | * | 9/2001 | Pulido et al. .............. 174/77 R |
| 6,326,550 | B1 | * | 12/2001 | Dyer et al. ..................... 174/93 |
| 6,677,536 | B2 | * | 1/2004 | Alznauer et al. ........ 174/152 R |
| 6,737,587 | B2 | * | 5/2004 | Amerpohl et al. ........... 174/142 |
| 7,005,582 | B2 | * | 2/2006 | Muller et al. ............. 174/77 R |
| 7,193,156 | B2 | * | 3/2007 | Alznauer et al. ........ 174/152 R |

FOREIGN PATENT DOCUMENTS

| EP | 0667665 | 8/1995 |
| EP | 0683555 | 11/1995 |
| EP | 1494329 | 1/2005 |
| FR | 931279  | 2/1948 |
| FR | 2083602 | 12/1971 |
| FR | 2547451 | 12/1984 |

* cited by examiner

*Primary Examiner*—Dhiru R Patel
(74) *Attorney, Agent, or Firm*—Darby & Darby

(57) ABSTRACT

A cable sealing end includes a base fitting configured for mounting on a base; a top fitting configured for securing an overhead conductor; an insulating body made of polymeric material; a conductive connection device configured to form a connection between a cable conductor and the top fitting; and a supporting element. The supporting element includes an elongated metal body; a top plate disposed on the elongated metal body and securable to the top fitting; and a metallic cylindrical structural component. The structural component projects into an interior of the insulating body and has a base flange disposed adjacent to the base fitting. The structural component has a length of one quarter to one third of a length of the insulating body. An entire length of the elongated metal body and the structural component, with the exception of the base flange, are embedded in the insulating body.

15 Claims, 2 Drawing Sheets

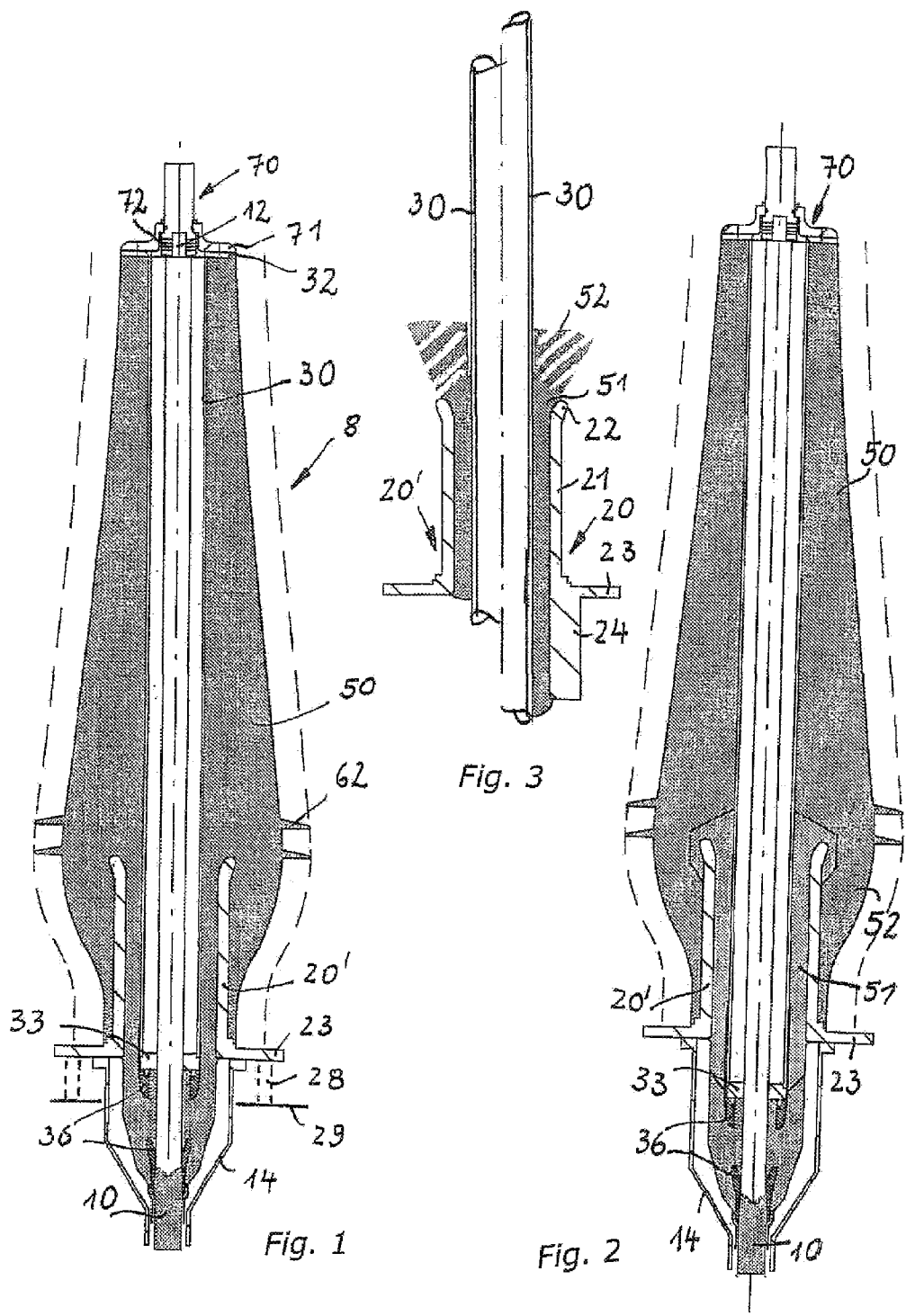

OUTDOOR SEALING END

Priority is claimed to German patent application DE 10 2006 036 233.0, filed Aug. 3, 2006, and which is hereby incorporated by reference herein.

The invention relates to a cable sealing end, preferably an outdoor sealing end for medium or high voltage, preferably to sealing ends with a post-insulator function for which no oils or other chemical fillers are used as an insulating material. Sealing ends of this kind are also described as dry sealing ends.

BACKGROUND

Sealing ends are known whereby an insulating body configured so as to be mechanically stable absorbs the forces (tensile loads and bending forces from the overhead conductor cable, weight of the inserted cable) acting on the sealing end. Insulating bodies of this kind may be made of porcelain or of fibre-reinforced plastics materials. As a result, these sealing ends have a disproportionately high weight and are unwieldy to install and normally require an insulating fluid.

A cable sealing end with an insulating body made of a rigid polymer configured so as to be mechanically stable—but without the use of insulating fluid—is described in EP 1494329 A1. In this device—and in the devices described hereinafter—the principle is implemented that the stability of the sealing end is even further improved by intimately connecting the insulating body to a rigid conductive element. The lateral forces at the head end of the cable sealing end can thus be fully absorbed.

A similar dry sealing end is shown in EP 0667665 B1. The forces are diverted from the overhead conductor connection via the rigid conductive element, via a basic element with a field control and insulating device to the bearing structure. The weakness of this arrangement is the transition from the conductive, rigid element to the basic element.

A further cable sealing end with a self-supporting structure is described in EP 0683555 A1. The mechanical rigidity is again provided by a rigid metal tube or a rigid tube provided with a conductive coating, which is introduced over a section of the total length of the sealing end between a securing platform and an overhead conductor terminal. The end of the insulating body made of relatively rigid polymer positioned towards the cable inlet opening is configured as an inlet cone. The conical terminating end of the cable configured with control electrodes and so as to be flexible is inserted into this cable inlet opening and is compressed by means of clamping means so as to have a non-positive and positive fit. When a cable is replaced, the entire structure must be dismantled. In particular, the clamping means (bottom) and the securing means of the overhead conductor (top) must be undone. This time and effort with regard to installation work is disadvantageous.

SUMMARY

It is an aspect of the present invention to provide a cable sealing end, preferably a high-voltage outdoor sealing end, that is economical to manufacture and that fully satisfies the mechanical requirements.

The present invention provides a cable sealing end. The cable sealing end includes a base fitting configured for mounting on a base; a top fitting configured for securing an overhead conductor; an insulating body made of polymeric material; a conductive connection device configured to form a connection between a cable conductor and the top fitting; and a supporting element. The supporting element includes an elongated metal body; a top plate disposed on the elongated metal body and securable to the top fitting; and a metallic cylindrical structural component. The structural component projects into an interior of the insulating body and has a base flange disposed adjacent to the base fitting. The structural component has a length of one quarter to one third of a length of the insulating body. An entire length of the elongated metal body and the structural component, with the exception of the base flange, are embedded in the insulating body.

BRIEF DESCRIPTION OF THE DRAWINGS

Embodiments of the outdoor sealing end are shown in the drawings. They each show in cross-section in detail:

FIG. 1 a first cable sealing end with integrated field control electrodes,

FIG. 2 a second cable sealing end with integrated field control electrodes,

FIG. 3 two embodiments of the structural component,

DETAILED DESCRIPTION

Figures 4, 5, 6:
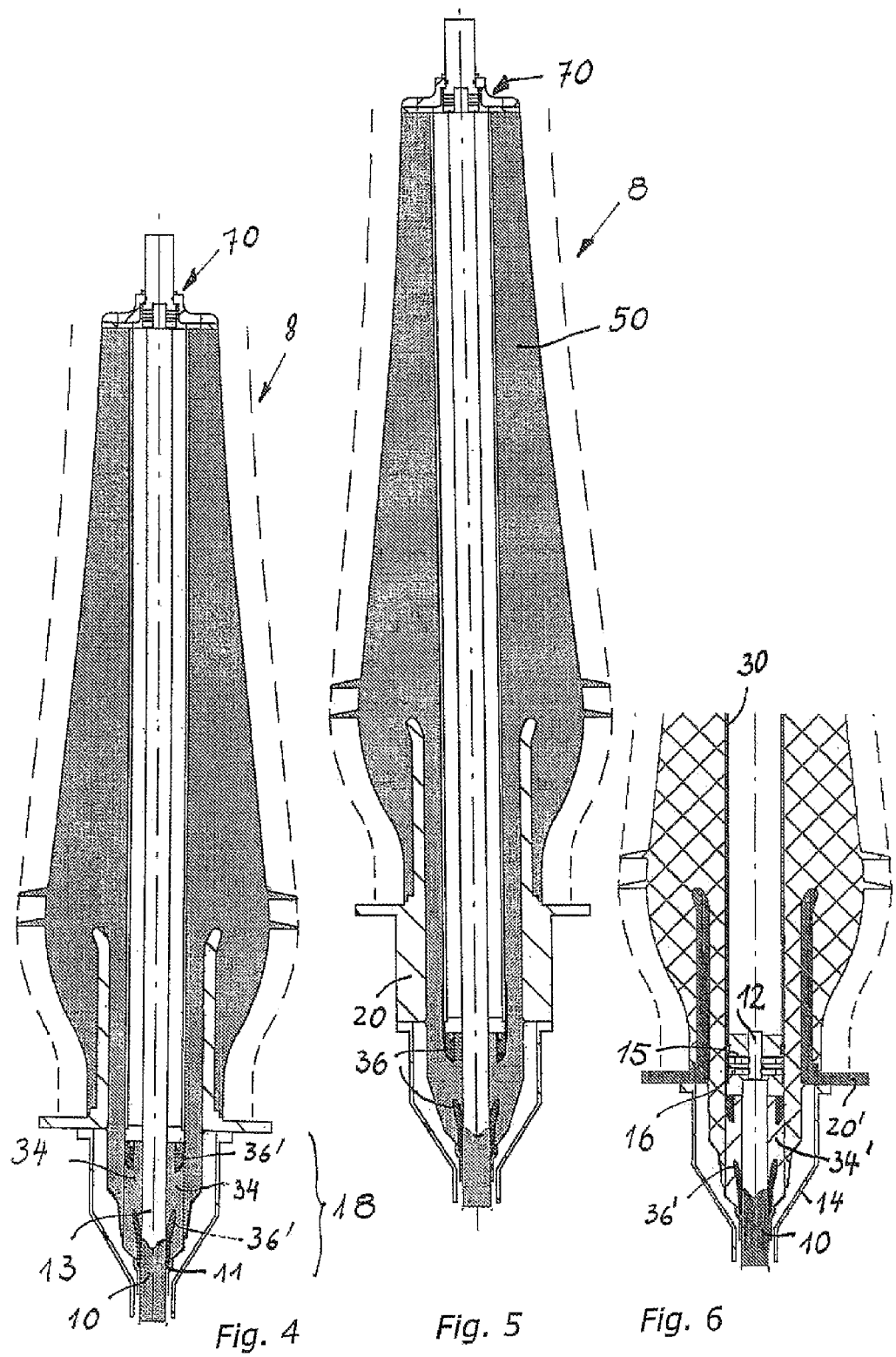
FIG. 4 a cable sealing end with a field control adapter.
FIG. 5 a fourth cable sealing end.
FIG. 6 a detail of the conductor connection with a cable plug contact.

An aspect of the invention is the supporting element of the cable sealing end made of two metallic parts (an elongated metal body—here a tube—and a structural component) and the insulating body made of only one elastomeric material. The structural component should be configured so as to have a length of one quarter to one third of the length of the insulating body. The metal body and the structural component give the cable sealing end the necessary stability. The insulating body is made of elastomeric material. The configuration of an insulating body of this kind with the supporting elements suffices to fully absorb the forces at the head end of the cable sealing end.

With the insulating body being formed from an elastomeric material, the invention avails itself of the advantage of configuring both the insulating body and the shield plates of the insulating body so as to be manufacturable from a uniform material. Furthermore, the potential control element can be integrated in the insulating body for most applications wherein the insulating body is manufactured so as to fit one cable dimension. For a small number of applications deviating therefrom, it is proposed to use a field control adapter so that cables with different cable diameters may be used.

A top plate positioned towards the top fitting and secured to the top fitting is arranged on the metallic supporting tube; a base flange positioned towards the base fitting is arranged on the structural component. Into the interior of the insulating body the structural component comprises a field control cylinder. The supporting tube (in its full length) and the field control cylinder of the structural component are hermetically embedded in the insulating body. The cable sealing end with an inner post-insulator function should preferably be used for electric high-voltage cables from 72 to 500 kV.

To manufacture the supporting element, the metallic supporting tube (with the top plate) and the structural component are placed into a tool and the insulating material of the insulating body is poured in, which sets or hardens in the tool. The shield profile can also be formed in the tool from the outset.

The insulating material of the insulating body is made of materials that are suitable and tested for the application, for example of at least one synthetic elastomer, such as silicone rubber (RTV silicone rubber or LSR), or of ethylene propylene rubber or ethylene propylene diene rubber (EPR, EPDM). With the exception of the cable inlet portion, the insulating body may be materially reinforced, for example with glass fibres. The Shore hardness of the insulating body should not be too great, as the insulating body should be elastically expandable in the cable inlet section. The Shore hardness of the insulating body should thus be greater than 35 and may attain approximately 55. The diameter of the aperture in the region of the cable inlet section of the insulating body is manufactured so as to be a few percent smaller than the diameter of the cable end to be inserted, in order to obtain a good press-on pressure. The insulating body is slid on over the cable end. As no further insulating materials are used, the cable sealing end belongs to the dry systems.

The parts of the supporting element form a unit for embedding the cable end into the sealing end, for securement on a stable base (traverse) and for attaching the overhead conductor to the top fitting. The supporting tube and the structural component (as parts of the supporting element) fully absorb the mechanical load of the forces acting on the sealing end, as the overlap length between the supporting tube and the structural component is particularly long. In contrast to known sealing ends, the insulating body is configured so as to be relatively weak or thin.

The top fitting substantially comprises an electrically conductive terminating plate, which rests on the top plate arranged on the supporting tube and is bolted to this. The top fitting furthermore comprises an overhead conductor connection piece, in which a further thread for securing an ear may be made. The electrical contact between the cable conductor and the top fitting is produced in the terminating plate via a metallic pressing or via tear-off bolts. The parts of the supporting element of the present arrangement are configured and dimensioned in such a way that they absorb all forces occurring and transfer them to the base fitting, extremely slight elastic deformations being permitted. 5 kN is calculated to be a typical measurement of possible lateral forces, with the result that the mechanical design is to be determined with reference to this characteristic.

The cable sealing end is mounted on one side on a stable base, preferably for securing on a traverse. The cable achieves its grip on the cable sealing end by means of the attachment of the cable conductor to the top fitting. No further means for securing the cable are otherwise provided on the cable sealing end and on the base fitting.

On a base fitting there are means for electrically connecting the cable shield with the earth potential, preferably in the form of a metal cap. The latter also serves to protect and/or affix the cable sheath.

Embodiments of the cable sealing end may have the following features:

The cable conductor is guided to the top fitting and is conductively secured there. As an alternative embodiment, however, the cable conductor may also be inserted into a cable plug contact, which is conductively connected with the top fitting. The cable plug contact may preferably be located at the lower end of the supporting tube, or else approximately in the middle of the sealing end. In the case of an embodiment of this kind, the supporting tube becomes an active conductor. In the case of the last-disclosed embodiment, the top fitting may be simply designed and configured so as to be closed, as means for securing the cable conductor may be omitted in this instance.

The field control cylinder is constructed with the base flange so as to be a single part.

A cylindrical tube portion is formed on the base flange in the direction of the cable inlet opening. This achieves a reinforcement of the structural component, through which an even greater resistance to load transmission from the overhead conductor to the base fitting is achieved and the sealing end is reinforced.

For field control at non-continuous potential transitions at the shouldered cable end, different solutions in the cable sealing end are proposed. A first embodiment may consist in that field control elements made of elastomeric material are embedded in the insulating body. Embedding is effected during the manufacture of the supporting element, where together with the metallic parts, the field control elements also are placed into the tool and are ensheathed there with the insulating material of the insulating body.

An alternative embodiment may consist in that, separate from the insulating body—and thus separate also from the above-disclosed manufacturing step—an appropriate field control adapter made of elastomeric material is arranged in the cable sealing end.

The insulating body may be made of different materials in the interior of the structural component and outside of the structural component. This property again makes reference to the manufacturing process of the supporting element. The parts of the supporting element, supporting tube and structural component are placed into the tool and in the region (in the interior) of the structural component are filled with a first insulating material and left to set or harden. The remaining space in the tool is then filled with an insulating material that is different to the first insulating material, and it subsequently achieves its ultimate strength.

Means for electrically connecting the cable shield with the earth potential are provided, it being possible to use a metallic cap for example.

The surface of the insulating body consists of a shield profile applied in an injection-moulding or casting process. The mass applied is relatively thin; it scarcely contributes to mechanical reinforcement of the structure. The length and in particular the diameter of the insulating body must be selected in such a way that the requirements for sufficient insulation and the prevention of atmospheric flashovers at the full operating voltage are satisfied. This requirement may be preferably improved if the surface of the insulating body is coated with a resistive or refractive control coating. Coatings of this kind serve to render consistent the electric field distribution. Coatings of thin conductive material or of layers of semi-conductive synthetic materials are known for this purpose. A special embodiment of a conductive coating is disclosed in FR 2 547 451 A1, where conductivity depends non-linearly on the voltage, and which is hereby incorporated by reference herein.

The sealing end is suitable for outdoors and for interiors.

The conventional process steps for the preparation of the cable end for installation shall be disclosed briefly: removal of the outer sheath, bending of the shielding wires and connection of a means to earth the cable shield, peeling back of the outer conducting layer, exposing of the cable conductor and, if necessary, use of a control adapter (if the second embodiment is used). The cable end prepared in this way is inserted into the sealing end from below and the cable conductor is secured to the top fitting. After preparations of this kind, the sealing end can be raised onto a traverse and secured there. It is also possible, however, to arrange the sealing end beforehand on a pylon or a different attachment location, and to then insert and secure the cable end. The installation sequence depends on the local conditions and can be effected flexibly.

The cable sealing end is designed so as to be relatively uniform—even for differing voltage levels. It may be provided that one type of an sealing end is manufactured for each different voltage range, with, for instance, five types being configured for voltages between 70 and 500 kV. Significant type differences are accommodated with field control adapters and insulating bodies configured so as to differ in diameter (and possibly also in length). For instance, therefore, the dimensions of the field control adapters could be graded in diameter to be 30 to 40, 40 to 50, 50 to 60, 60 to 70 and 70 to 80 mm. Cables belonging to different voltage ranges are 'supported' by suitable field control adapters and insulating bodies in each case.

To configure a cable sealing end—for example for a nominal voltage of 145 kV and with a conductor cross-section of 1200 mm2—a number of typical dimensions shall be disclosed:

for the supporting tube: length 1500 mm, diameter 110 mm, wall thickness 2.5 mm;

for the insulating body: length including the lower field control element 1750 mm, greatest diameter (including shield plates) 350 mm, shield projection 50 mm, shield plate thickness 7 mm; diameter at the top fitting (including shield plates) 200 mm;

for the structural component: internal diameter 180 mm, cylinder wall thickness 12 mm, length above base plate 450 mm; gap between the cylinder and supporting tube (layer thickness of the insulation) approx. 25 mm.

FIG. 1 shows the preferred single-part embodiment of a cable sealing end 8 with potential control electrodes 36 integrally embedded in the insulating body 50. Varying embodiments manufactured for different voltage levels differ in the internal and external diameters of the insulating body 50 and the field control technique used. The single-part embodiment of the cable sealing end can be used for most applications if the insulating body is pre-fabricated so as to fit one cable dimension. For a small number of applications deviating therefrom, embodiments are shown in FIGS. 4 and 6, where a field control adapter 34 or 34' is used in order that cables with different cable diameters may be used.

The embedded control electrodes 36 (36') are made of insulating material. The surface of the insulating body 50 consists of an integrally moulded shield profile 62.

The central and supporting elements of the cable sealing end consist of the metallic supporting tube 30 and the structural component (20, 20'). (At the top) a top plate 32 positioned towards the top fitting 70 is secured (preferably welded on) to the tube 30 preferably manufactured from aluminium. The base flange 23 positioned towards the base fitting 18 is arranged on the structural component 20, 20' (FIG. 3) preferably manufactured from aluminium. Projecting into the interior of the insulating body is a cylinder 21, which widens out at the upper edge into a field control funnel 22. The supporting tube (in its full length) and the field control cylinder 21 are hermetically embedded in the insulating body 50. At the base of the supporting tube, a ring 33 or a different suitable means (FIG. 2) may be provided, which is used to centre the inserted cable end. The metallic supporting tube 30 is at a high-voltage potential.

The cable sealing end is bolted at the base fitting to a base plate or a flange on a carrying frame (for example a traverse via post insulators 28).

The high-voltage cable 10 is inserted into the lower region of the sealing end. The cable end with cable shield 11 removed is guided inside the supporting tube 30. The cable end can also already be shouldered level with the base fitting 18 down to the cable conductor 12, with the result that the cable conductor is located in its full length in the supporting tube. The cable core (as a bare conductor, or still sheathed with cable insulation) guided into the supporting tube is sealed via the top fitting 70. The connection to an overhead conductor is achieved via the terminating plate 71 of the top fitting 70, which terminating plate 71 is provided with tapped holes and is supported on the top plate 32 (and is secured with bolts). The cable conductor is secured in the conductor connection 72 in the terminating plate with tear-off bolts or via a metal pressing or embossing in the top fitting. An overhead conductor connection piece, to which the overhead conductor is to be secured, can also be discerned on the top fitting.

The shielding wires of the cable 11 are in electrical contact (via a sheet-metal shield or a cap 14) with the base plate or the flange 23 of the base fitting, which is mounted via insulators 28 on a traverse 29 of a pylon.

As disclosed, field control electrodes 36 (36') or adapters 34 (34') are used for controlling non-continuous potential transitions. For varying cables differing in diameter associated with differing voltages, suitable embodiments may be kept available in each case.

FIG. 2 shows a cable sealing end that differs from the embodiment in FIG. 1 in that the insulating body 50 is made of two different materials (51 and 52). The materials are located on top of one another without an actual interface, or merge relatively homogeneously into one another. The intermediate space 51 in the structural component contains a filler of particularly mechanically resilient plastics material, for example of casting resin. Filling using a material (51) that is more mechanically resilient than silicone rubber (52) increases mechanical stability and serves the better transmission of loads.

FIG. 3 shows at the left and right two embodiments of the metallic structural component 20, 20' in cross-section. The substantial parts of the structural component are the base plate 23 and a cylinder 21 projecting into the insulating body 50. The cylinder has approximately the length of 20 to 35% of the length of the insulating body. The intermediate space between the cylinder 21 and the supporting tube 30 in the structural component is filled with insulating material 51, preferably of particularly mechanically resilient plastics material. The intimate material connection between the supporting tube 30, the structural component 20 and the insulating body 50 results in a supporting structure that is suitable for fully absorbing the mechanical load on the sealing end. The difference between the structural component 20' shown in the left half of the drawing in FIG. 2 and the structural component 20 shown in the right half of the drawing consists in the cylindrical extension 24 below the base plate 23. The assembly of a structural component 20 with a cable sealing end is shown in FIG. 5.

In the region of the base fitting 18 there are in the insulating body 50 devices for potential control, the insulating body reaching out in all embodiments towards the cable beyond the structural component 20 and ending at approximately the level of the exposed conducting layer—typically made of cross-linked polyethylene (VPE)—of the cable insulation. It is important that the resilience of the insulating body in the region of the cable inlet is sufficiently great in order that the insulating body is expandable and the cable end is insertable there. Cable diameters may be between 40 to 90 mm (in the case of 110 kV). As a result of this, a resilient expansion of approx. 5 to 10 mm is required for the cable inlet region of the insulating body.

Configuration of the insulating body 50 is such that the outer field strength in all operating conditions is below critical values. The fitting of field control electrodes results in a relatively large diameter in the lower region. The diameter above the field control region narrows.

FIG. 4 shows a further embodiment of cable sealing end, which differs in the form of field control in the region of the cable inlet. In FIG. 4 (and in FIG. 6), a field control adapter 34, 34' for potential control at the lower end of the cable sealing end is used separated from—but in close contact with—the insulating body 50. The potential control adapter 34, 34' consists—as is conventional—of insulating material with embedded control electrodes 36'.

Field control adapters 34, 34' differing in size (in length and diameter) are used in order to accommodate different cable types. The field control adapter is slid on over the conducting layer of the cable insulation of the cable with shield removed, expanding while doing so. The field control adapter is supported with its control electrodes on the transition region from the conductor insulation and end of the conducting layer of the cable. The configuration of the field control element of the embodiment according to FIG. 4 is known for the configuration of multiple-part cable sleeves, in the present case the lower part of the field control element of the cable sealing end virtually equating to one half of a multiple-part cable sleeve of this kind. With these cable sleeves, a field control element is slid on both sides of the cable inlet and an overlap with a stable sleeve element is formed in the splice region.

Instead of a field control adapter, a voltage-dependent surface coating as a field control layer with a resistive or refractive control coating may also be present in this region.

The cable sealing end in FIG. 5 differs from a cable sealing end according to FIG. 1 due to a different design of the structural components 20 and 20'. Below the base plate 23, the structural component 20 is extended towards the cable with a cylinder 24. As a result, on the structural component, the region of force transmission from the top fitting to the base fitting is reinforced. The cable sealing end becomes stiffer and it can absorb greater forces, as a result of which it is suitable for use where particularly strong forces emanating from the overhead conductor are to be absorbed.

It is furthermore noted that the embodiments according to FIG. 2 and FIG. 5 may also be configured in each case with a field control adapter (34, 34')—that is, not with integrated field control electrodes—, as is shown and disclosed in the example in FIG. 4 and FIG. 6.

FIG. 6 shows in the region of the lower end of the supporting tube 30 a detail with a cable plug contact 15. A field control adapter 34' is inserted for potential control. The top fitting is now configured to be integral and closed, as a conductor connection is not required in this region. With an embodiment of this kind, the top fitting can be welded as a unit to the now current-carrying supporting tube 30. The cable 10—in particular the exposed cable conductor 12—ends as soon as it enters the supporting tube in a connection piece arranged on the cable conductor, the external diameter of which is configured so as to fit the internal diameter of the supporting tube. Current is transmitted to the supporting tube via contact plates 16 on the plug contact 15. The connection piece is connected to the cable conductor using a bolting or pressing technique.

The present invention is not limited to the exemplary embodiments described herein.

REFERENCE NUMERALS

8 Cable sealing end
10 High-voltage cable
11 Cable shield
12 Cable conductor
13 Cable end with cable shield removed
14 Cap with shield connection
15 Cable plug contact
16 Contact plates
18 Base fitting
20' 20 Structural component
21 Field control cylinder
22 Potential control funnel
23 Base flange
24 Tube portion
28 Post insulator
29 Base, traverse
30 Supporting tube
32 Top plate
33 Centring ring
34 First field control adapter (FIG. 4)
34' Second field control adapter (FIG. 6)
36, 36' Control elements or electrodes
50 Insulating body
51 Insulating material in the region of the structural component
52 Insulating material of the insulating body
62 Shield ribs
70 Top armature
71 Terminating plate
72 Conductor connection

What is claimed is:

1. A cable sealing end comprising:
a base fitting configured for mounting on a base;
a top fitting configured for securing an overhead conductor;
an insulating body made of polymeric material;
a conductive connection device configured to form a connection between a cable conductor and the top fitting; and
a supporting element including
an elongated metal body;
a top plate disposed on the elongated metal body and securable to the top fitting; and
a metallic cylindrical structural component projecting into an interior of the insulating body and having a base flange disposed adjacent to the base fitting, the structural component having a length of one quarter to one third of a length of the insulating body;
wherein an entire length of the elongated metal body and the structural component, with the exception of the base flange, are embedded in the insulating body.

2. The cable sealing end as recited in claim 1 wherein the sealing end is an outdoor sealing end for a transition from an electric medium- or high-voltage cable to the overhead conductor.

3. The cable sealing end as recited in claim 1 wherein the structural component includes a widened portion disposed in the interior of the insulating body and forming a potential control funnel.

4. The cable sealing end as recited in claim 1 wherein the cable conductor is conductively secured to the top fitting.

5. The cable sealing end as recited in claim 1 wherein the conductive connection device is a cable plug contact configured to receive the cable conductor, the cable plug contact being conductively connected to the top fitting.

6. The cable sealing end as recited in claim 1 wherein the structural component includes a field control cylinder integral with the base flange.

7. The cable sealing end as recited in claim 1 wherein the structural component includes a cylindrical tube portion projecting from the base flange in a direction of the cable inlet opening.

8. The cable sealing end as recited in claim 1 further comprising a field control electrode embedded in the insulating body, the field control electrode being made of elastomeric material.

9. The cable sealing end as recited in claim 1 further comprising a field control adapter, the field control adapter being made of elastomeric material.

10. The cable sealing end as recited in claim 9 wherein the insulating body is made of a first elastomeric material in a portion of the insulating body disposed inside the structural component and is made of a second elastomeric material in a portion of the insulating body disposed outside the structural component, the first and second elastomeric materials being different from each other.

11. The cable sealing end as recited in claim 10 wherein the first elastomeric material is casting resin.

12. The cable sealing end as recited in claim 1 wherein the insulating body is made of a first elastomeric material in a portion of the insulating body disposed inside the structural component and is made of a second elastomeric material in a portion of the insulating body disposed outside the structural component, the first and second elastomeric materials being different from each other.

13. The cable sealing end as recited in claim 12 wherein the first elastomeric material is casting resin.

14. The cable sealing end as recited in claim 1 further comprising an electrical connection device configured to connect a cable shield with earth potential.

15. The cable sealing end as recited in claim 1 wherein a surface of the insulating body includes an injection-molded or cast shield profile.

\* \* \* \* \*